United States Patent
Bang et al.

(10) Patent No.: US 11,958,437 B2
(45) Date of Patent: Apr. 16, 2024

(54) METHOD AND DEVICE FOR DETECTING SEAT BELT OF VEHICLE

(71) Applicants: Hyundai Motor Company, Seoul (KR); Kia Corporation, Seoul (KR)

(72) Inventors: Taeyoung Bang, Gyeonggi-do (KR); Youngrok Kim, Gyeonggi-do (KR); Soo Chul Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 80 days.

(21) Appl. No.: 17/894,717

(22) Filed: Aug. 24, 2022

(65) Prior Publication Data

US 2023/0182680 A1 Jun. 15, 2023

(30) Foreign Application Priority Data

Dec. 15, 2021 (KR) .......................... 10-2021-0179424

(51) Int. Cl.
*B60R 22/48* (2006.01)

(52) U.S. Cl.
CPC ........ *B60R 22/48* (2013.01); *B60R 2022/485* (2013.01); *B60R 2022/4866* (2013.01)

(58) Field of Classification Search
CPC ............. B60R 22/48; B60R 2022/485; B60R 2022/4866; B60Q 9/00; B60W 40/00; B60W 40/08; G06V 10/25; G06V 10/28; G06V 20/00; G06V 20/59
See application file for complete search history.

(56) References Cited

U.S. PATENT DOCUMENTS

| | | | | |
|---|---|---|---|---|
| 2015/0105976 A1* | 4/2015 | Shikii | ................. | B60W 50/14 |
| | | | | 701/36 |
| 2023/0001885 A1* | 1/2023 | Joshi | ................. | G06V 10/62 |
| 2023/0196794 A1* | 6/2023 | Chung | ................. | G06V 10/25 |
| | | | | 382/103 |

OTHER PUBLICATIONS

NPL Seasrch (Dec. 11, 2023).*

\* cited by examiner

*Primary Examiner* — Van T Trieu
(74) *Attorney, Agent, or Firm* — Fox Rothschild LLP

(57) ABSTRACT

Disclosed is a method of detecting a seat belt of a vehicle, the method comprising: storing, by a controller, a pattern before an occupant of a vehicle wears a seat belt webbing and a pattern after the occupant of the vehicle wears the seat belt webbing photographed through a region of interest of a vision sensor in a memory; receiving, by the controller, an image for the seat belt webbing photographed in the region of interest of the vision sensor; determining, by the controller, whether the pattern of the seat belt webbing stored in the memory is detected from the image of the seat belt webbing; and when the pattern of the seat belt webbing is not detected, controlling, by the controller, a display device to display a first warning message indicating that the seat belt webbing is not detected.

17 Claims, 7 Drawing Sheets

METHOD AND DEVICE FOR DETECTING SEAT BELT OF VEHICLE

CROSS-REFERENCE TO RELATED APPLICATION(S)

This application claims, under 35 U.S.C. § 119(a), the benefit of Korean Patent Application No. 10-2021-0179424, filed in the Korean Intellectual Property Office on Dec. 15, 2021, the disclosure of which is incorporated herein by reference in its entirety.

BACKGROUND

Technical Field

Embodiments of the present disclosure relate to a vehicle, and more particularly, to a method and a device for detecting a seat belt of a vehicle.

Description of the Related Art

In general, a vehicle is provided with seats for providing a comfortable ride to occupants, and a seat belt is provided on the seat to restrain the occupant to the seat when a vehicle crash occurs, thereby aiding in securing the safety of the occupant.

However, drivers or occupants of many vehicles avoid normal wearing of the seat belt due to the feeling of pressure. Recently, when a seat belt is not worn, a continuous warning sound is generated, so depending on the driver, a dummy is fastened to the buckle that fastens the seat belt, or the seat belt is pulled out behind the driver's body and fastened to the buckle, such that various evasive actions are taking place.

The above information disclosed in this Background section is only for enhancement of understanding of the background of the present disclosure, and therefore it may contain information that does not form the existing technologies that are already known in this country to a person of ordinary skill in the art.

SUMMARY

The present disclosure has been made in an effort to provide a method and a device for detecting a seat belt of a vehicle, which are configured to rapidly and accurately check whether an occupant of a vehicle normally wears a seat belt by detecting a specific pattern formed in a seat belt webbing by using a vision sensor (or camera).

An exemplary embodiment of the present disclosure provides a method of detecting a seat belt of a vehicle, the method comprising: storing, by a controller, a pattern before an occupant of a vehicle wears a seat belt webbing and a pattern after the occupant of the vehicle wears the seat belt webbing photographed through a region of interest of a vision sensor in a memory; receiving, by the controller, an image for the seat belt webbing photographed in the region of interest of the vision sensor; determining, by the controller, whether the pattern of the seat belt webbing stored in the memory is detected from the image of the seat belt webbing; and when the pattern of the seat belt webbing is not detected, controlling, by the controller, a display device to display a first warning message indicating that the seat belt webbing is not detected.

The method may further comprise determining, by the controller, whether the pattern that is detected from the image of the seat belt webbing is the pattern before the occupant of the vehicle wears the seat belt webbing stored in the memory or the pattern after the occupant of the vehicle wears the seat belt stored in the memory, and, when the detected pattern is the pattern before the occupant of the vehicle wears the seat belt stored in the memory, controlling, by the controller, the display device to display a second warning message instructing the occupant of the vehicle to wear a seat belt.

When the detected pattern is the pattern after the occupant of the vehicle wears the seat belt stored in the memory, the controller may calculate a draw length of the seat belt webbing based on a sequence number corresponding to the topmost end pattern among detected patterns after the occupant of the vehicle wears the seat belt and a sequence number corresponding to the lowermost end pattern among the detected patterns after the occupant of the vehicle wears the seat belt.

The method may further comprise determining, by the controller, whether the draw length of the seat belt webbing is a draw length corresponding to normal wearing of the seat belt, in which when the draw length of the seat belt webbing is not the draw length corresponding to the normal wearing of the seat belt, the controller may control the display device to display a third warning message instructing the occupant of the vehicle to normally wear the seat belt.

When the draw length of the seat belt webbing is the draw length corresponding to the normal wearing of the seat belt, the controller may control the display device to display a normal wearing message indicating that the occupant of the vehicle normally wears the seat belt.

The vision sensor may comprise an infrared camera, and the pattern of the seat belt webbing may be formed by a paint highly reflecting infrared rays.

The pattern of the seat belt webbing may comprise patterns corresponding to numbers according to a numeral system.

The pattern may comprise quadrangular patterns or character patterns.

Another exemplary embodiment of the present disclosure provides a device for detecting a seat belt of a vehicle, the device comprising: a vision sensor which photographs a seat belt webbing through a region of interest; and a controller which stores a pattern before an occupant of a vehicle wears a seat belt webbing and a pattern after the occupant of the vehicle wears the seat belt webbing photographed through the region of interest in a memory, in which the controller receives an image for the seat belt webbing photographed in the region of interest, the controller determines whether the pattern of the seat belt webbing stored in the memory is detected from the received image of the seat belt webbing; and when the pattern of the seat belt webbing is not detected, the controller controls a display device to display a first warning message indicating that the seat belt webbing is not detected.

The controller may determine whether the detected pattern is the pattern before the occupant of the vehicle wears the seat belt webbing stored in the memory or the pattern after the occupant of the vehicle wears the seat belt stored in the memory, and when the detected pattern is the pattern before the occupant of the vehicle wears the seat belt webbing stored in the memory, the controller may control the display device to display a second warning message instructing the occupant of the vehicle to wear a seat belt.

When the detected pattern is the pattern after the occupant of the vehicle wears the seat belt stored in the memory, the controller may calculate a draw length of the seat belt webbing based on a sequence number corresponding to the topmost end pattern among detected patterns after the occupant of the vehicle wears the seat belt and a sequence number corresponding to the lowermost end pattern among the detected patterns after the occupant of the vehicle wears the seat belt.

The controller may determine whether the draw length of the seat belt webbing is a draw length corresponding to normal wearing of the seat belt, and when the draw length of the seat belt webbing is not the draw length corresponding to the normal wearing of the seat belt, the controller may control the display device to display a third warning message instructing the occupant of the vehicle to normally wear the seat belt.

When the draw length of the seat belt webbing is the draw length corresponding to the normal wearing of the seat belt, the controller may control the display device to display a normal wearing message indicating that the occupant of the vehicle normally wears the seat belt.

The vision sensor may comprise an infrared camera, and the pattern of the seat belt webbing may be formed by a paint highly reflecting infrared rays.

The pattern of the seat belt webbing may comprise patterns corresponding to numbers according to a numeral system.

The pattern may comprise quadrangular patterns or character patterns.

The method and the device for detecting the seat belt of the vehicle according to the exemplary embodiments of the present disclosure may rapidly and accurately detecting (sensing) erroneous wearing and non-wearing of the seat belt of the occupant of the vehicle by detecting (sensing) the pattern formed on a surface of the seat belt webbing by using the vision sensor.

In further aspects, vehicles are provided that comprise a method or device disclosed herein.

BRIEF DESCRIPTION OF THE DRAWINGS

In order to help more full understanding of the drawings used in the detailed description of the present disclosure, a brief description of each drawing is provided.

DETAILED DESCRIPTION

Figure 1:
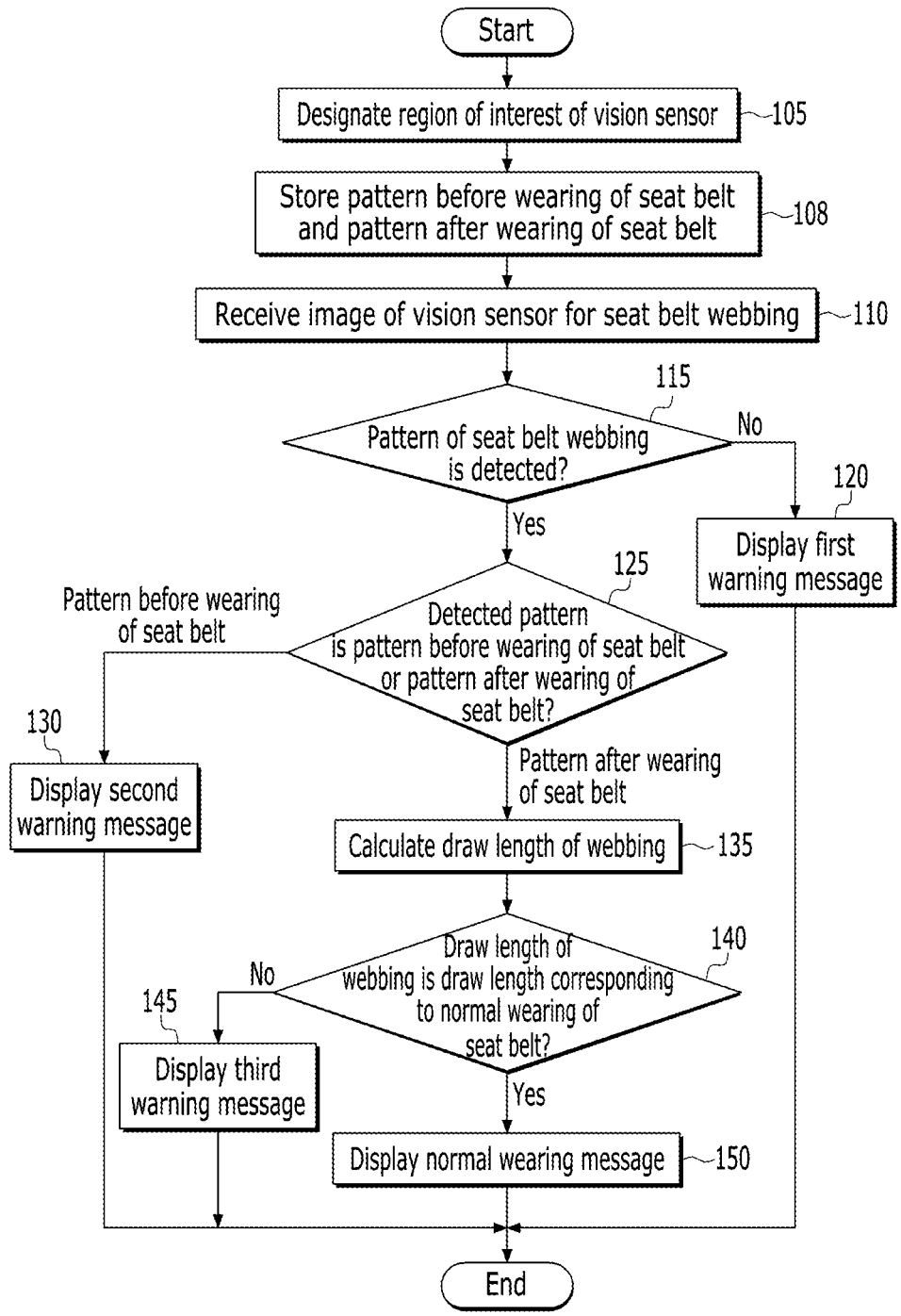
FIG. 1 is a flowchart illustrating a method of detecting a seat belt of a vehicle according to an exemplary embodiment of the present disclosure.

In order to fully understand the present disclosure and the object achieved by the implementation of the present disclosure, reference should be made to the accompanying drawings illustrating the exemplary embodiment of the present disclosure and the contents described in the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, the present disclosure will be described in detail by describing the exemplary embodiment of the present disclosure with reference to the accompanying drawings. In the following description of the exemplary embodiment, a detailed description of known configurations or functions incorporated herein will be omitted when it is judged that the detailed description may make the subject matter of the present disclosure unclear. Like reference numerals presented in each drawing designate like elements throughout the specification.

The term used in the present specification is simply used for describing a specific embodiment and does not intend to limit the present disclosure. A singular expression includes a plural expression unless it is specifically described to the contrary in the context. In the present specification, it should be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Throughout this specification, when it is described that an element is "coupled" to another element, the element may be "directly coupled" to the another element or "electrically or mechanically coupled" to the another element a still another element interposed therebetween.

All terms used herein including technical or scientific terms have the same meanings as meanings which are generally understood by those skilled in the art to which the present disclosure pertains unless they are differently defined. Terms defined in generally used dictionary shall be construed to have meanings matching those in the context of a related art, and shall not be construed as ideal or excessively formal meanings unless they are clearly defined in the present application.

An occupant riding a vehicle (for example, autonomous vehicle) needs to normally wear a seat belt for safety. Therefore, a technology for inducing an occupant to wear a seat belt is required.

Figure 2:
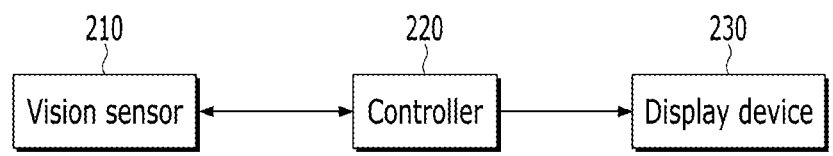
FIG. 2 is a block diagram illustrating a device for detecting a seat belt of a vehicle to which the method of detecting the seat belt of the vehicle illustrated in FIG. 1 is applied.
Figure 3:
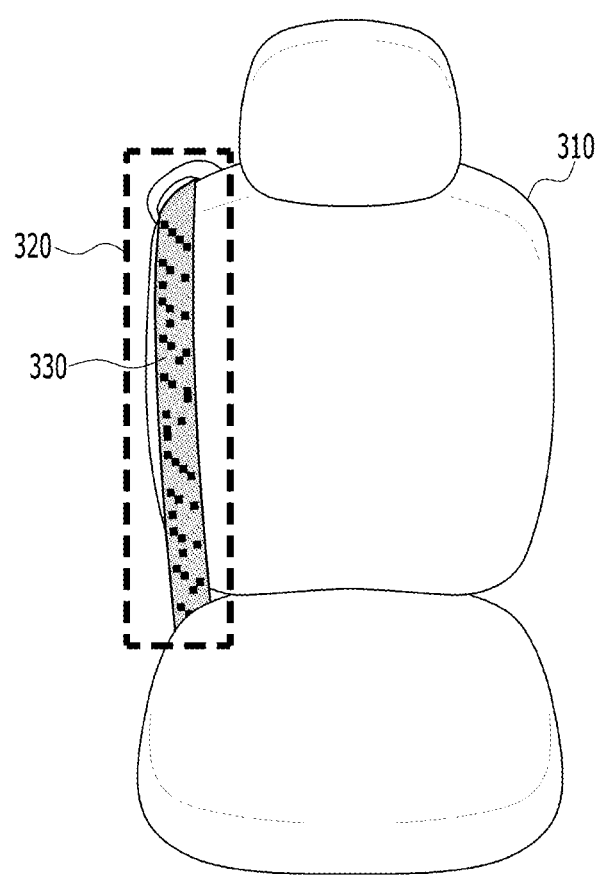
FIG. 3 is a diagram illustrating an image, in which a vehicle occupant does not wear a seat belt, generated by a vision sensor illustrated in FIG. 2.
Figure 4:
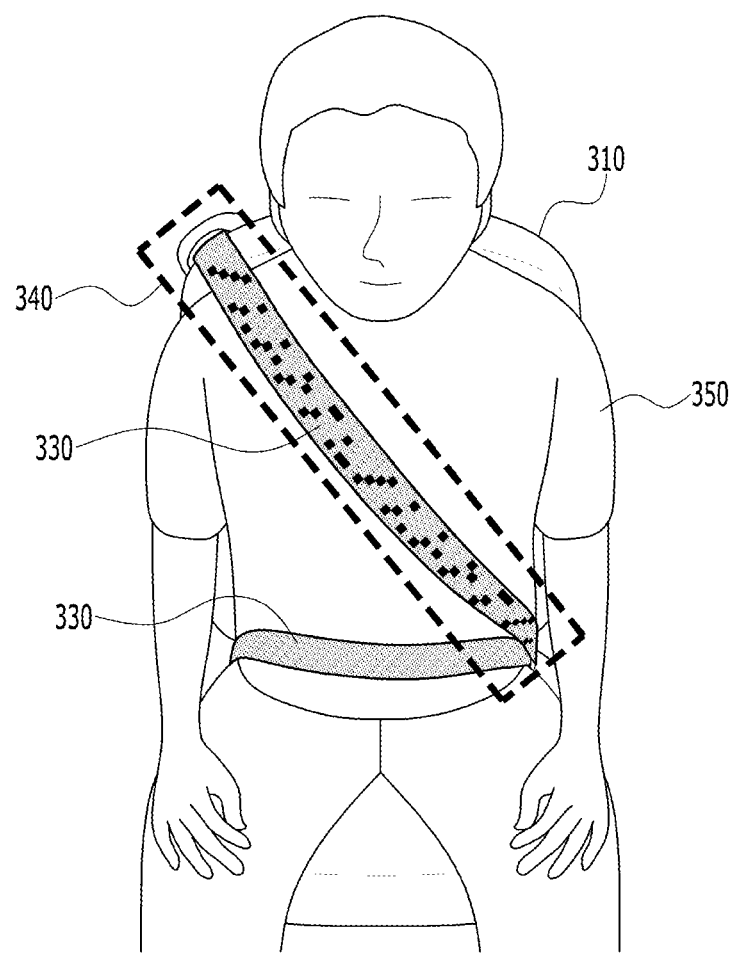
FIG. 4 is a diagram illustrating an image, in which a vehicle occupant wears a seat belt, generated by the vision sensor illustrated in FIG. 2.
Figure 5:
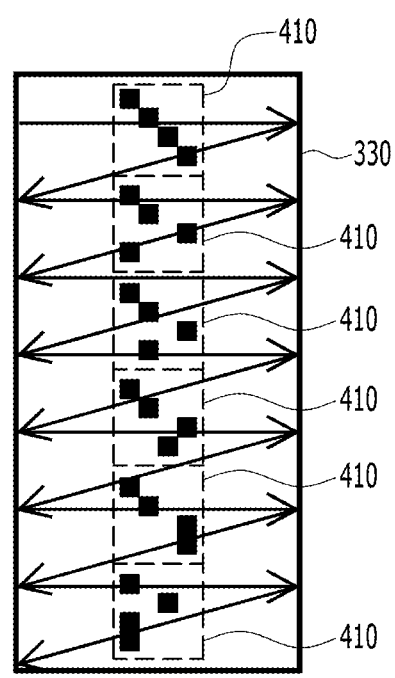
FIG. 5 is a diagram illustrating a pattern detected by a controller illustrated in FIG. 2.
Figure 6:
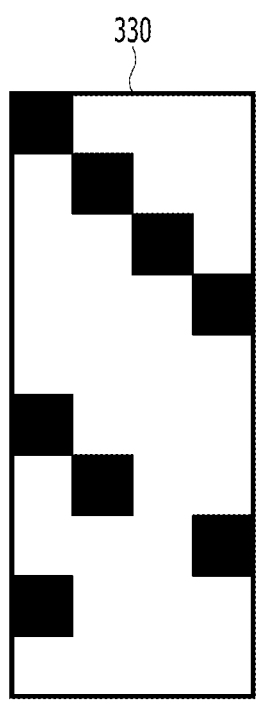
FIG. 6 is a diagram illustrating an exemplary embodiment of the pattern detected by the controller illustrated in FIG. 2.
Figure 7:
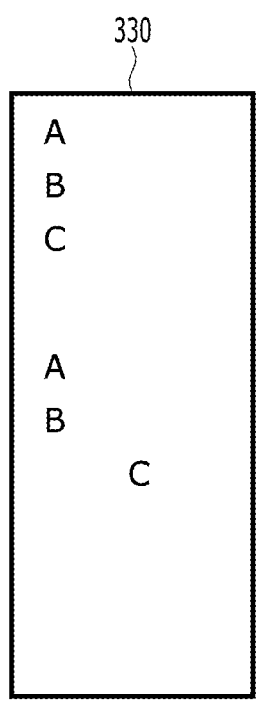
FIG. 7 is a diagram illustrating another exemplary embodiment of the pattern detected by the controller illustrated in FIG. 2.

FIG. 1 is a flowchart illustrating a method of detecting a seat belt of a vehicle according to an exemplary embodiment of the present disclosure. FIG. 2 is a block diagram illustrating a device for detecting a seat belt of a vehicle to which the method of detecting the seat belt of the vehicle illustrated in FIG. 1 is applied. FIG. 3 is a diagram illustrating an image, in which a vehicle occupant does not wear a seat belt, generated by a vision sensor illustrated in FIG. 2. FIG. 4 is a diagram illustrating an image, in which a vehicle occupant wears a seat belt, generated by the vision sensor illustrated in FIG. 2. FIG. 5 is a diagram illustrating a pattern detected by a controller illustrated in FIG. 2. FIG. 6 is a diagram illustrating an exemplary embodiment of the pattern detected by the controller illustrated in FIG. 2. FIG. 7 is a diagram illustrating another exemplary embodiment of the pattern detected by the controller illustrated in FIG. 2.

Referring to FIGS. 1 to 7, in a designation operation 105, a controller 220 may be configured to designate (select) a Region Of Interest (ROI) of a vision sensor 210 which generates an image by photographing (capturing) a seat belt webbing (or a seat belt comprising a shoulder belt (chest belt) and a waist belt) 330 of the vehicle. The ROI of the vision sensor 210 may comprise an ROI 320 of FIG. 3 corresponding to an image region before an occupant of the vehicle wears the seat belt (safety belt) 330 and an ROI 340 of FIG. 4 corresponding to an image region after an occupant 350 of the vehicle wears the seat belt 330. The ROI of the vision sensor 210 is designated, so that whether the occupant 350 of the vehicle normally wears the seat belt may be rapidly and accurately determined.

As illustrated in FIG. 2, the device for detecting the seat belt of the vehicle may comprise the vision sensor 210, the controller 220, and a display device 230, such as a cluster of the vehicle.

The controller 220 may be configured to control the entire operations of the vehicle as an electronic control unit (ECU). The controller 220 may be, for example, one or more microprocessors operating by a program (control logic) or hardware (for example, a microcomputer) comprising the microprocessor, and the program may comprise a series of instructions for performing the method of detecting the seat belt of the vehicle according to the exemplary embodiment of the present disclosure. The instruction may be stored in a memory of the controller 220.

The vision sensor 210 may comprise an infrared camera receiving infrared rays and visible rays. For example, the vision sensor 210 may be installed in an A pillar, a room mirror, an overhead console, or a room lamp of the vehicle.

According to an operation 108 illustrated in FIG. 1, after an operation 105, the controller 220 may be configured to store a pattern before the occupant of the vehicle wears the seat belt webbing 330 and a pattern after the occupant of the vehicle wears the seat belt webbing photographed through the ROI of the vision sensor 210 in the memory.

According to an operation 110, after the operation 108, the controller 220 may be configured to receive an image for the seat belt webbing 330 photographed in the ROI of the vision sensor 210.

According to an operation 115, after the operation 110, the controller 220 may be configured to determine whether the pattern of the seat belt webbing 330 stored in the memory is detected in the received image of the seat belt webbing. The pattern 410 may be formed of a paint that highly reflects (reflects very well) infrared rays and be detected by the infrared camera. Therefore, whether the occupant of the vehicle normally wears the seat belt may be rapidly and accurately checked.

As indicated by an arrow of FIG. 5, the controller 220 may be configured to detect the patterns 410 by using a pattern detecting method (pattern detecting algorithm) using artificial intelligence (for example, an image detecting method using a Convolutional Neural Network (CNN) algorithm algorithm that is an artificial intelligence algorithm) performed on the image of the seat belt webbing 330 photographed in the ROI.

As illustrated in FIG. 5, the patterns 410 may be patterns corresponding to numbers according to a predetermined numeral system, and may be patterns (Forms) sequentially formed in a longitudinal direction of the seat belt webbing 330. For example, the pattern 410 may comprise a 4×4 pattern. The 4×4 patterns 410 may mean the patterns disposed on the surface of the seat belt webbing 330 in the order of size of a quaternary number (number of pictures).

For example, the pattern 410 may be composed of quadrangular patterns (for example, square patterns) that are 4×4 patterns shown in FIG. 6, or character patterns (letter patterns) or circular patterns shown in FIG. 7. Referring to FIG. 7, for example, the pattern 410 may be English letter patterns and 3×3 patterns. The 3×3 patterns may mean patterns disposed on the surface of the seat belt webbing 330 in the order of size of a ternary number.

When the pattern 410 of the seat belt webbing 330 is not detected, the process of the method of detecting the seat belt of the vehicle may proceed to an operation 120, and when the pattern 410 of the seat belt webbing 330 is detected, the process of the method of detecting the seat belt of the vehicle may proceed to an operation 125.

According to the operation 120, the controller 220 may be configured to control the display device 230 to display a first warning message indicating that the seat belt webbing 330 is not detected by the vision sensor 210 so that the occupant 350 of the vehicle sitting on the seat 310 of the vehicle is capable of viewing the first warning message. The first warning message may comprise a message indicating that a lens of the vision sensor 210 will be cleaned.

According to the operation 125, the controller 220 may be configured to determine whether the detected pattern is the pattern before the occupant of the vehicle wears the seat belt webbing 330 stored in the memory or the pattern after the occupant of the vehicle wears the seat belt webbing stored in the memory.

When the detected pattern is the pattern before the occupant of the vehicle wears the seat belt webbing 330 stored in the memory, the process of the method of detecting the seat belt of the vehicle may proceed to an operation 130, and when the detected pattern is the pattern after the occupant of the vehicle wears the seat belt stored in the memory, the process of the method of detecting the seat belt of the vehicle may proceed to an operation 135.

According to the operation 130, the controller 220 may be configured to control the display device 230 to display a second warning message instructing the occupant of the vehicle to wear the seat belt so that the occupant 350 of the vehicle is capable of viewing the second warning message.

According to the operation 135, the controller 220 may be configured to calculate a draw length of the seat belt webbing 330 according to the wearing of the seat belt of the occupant 350 of the vehicle based on a sequence number corresponding to the topmost end pattern among the detected patterns after the occupant of the vehicle wears the seat belt and a sequence number corresponding to the lowermost end pattern among the detected patterns after the occupant of the vehicle wears the seat belt. For example, the controller 220 may be configured to calculate the draw length of the seat belt webbing 330 by multiplying a sequence number difference value between the sequence number corresponding to the topmost end pattern and the sequence number corresponding to the lowermost end pattern and a length of one pattern 410. The length of one pattern 410 may be stored in the memory. In another exemplary embodiment of the present disclosure, the controller 220 may be configured to calculate a draw length of the seat belt webbing 330 according to the wearing of the seat belt of the occupant 350 of the vehicle based on a sequence number corresponding to the topmost end pattern among the detected patterns after the occupant of the vehicle wears the seat belt and a sequence number corresponding to the topmost end pattern among the detected patterns before the occupant of the vehicle wears the seat belt. For example, the controller 220 may be configured to calculate the draw length of the seat belt webbing 330 by multiplying a sequence number difference value between the sequence number corresponding to the topmost end pattern and the sequence number corresponding to the topmost end pattern and a length of one pattern 410.

According to an operation 140, the controller 220 may be configured to determine whether the draw length of the seat belt webbing 330 is a draw length corresponding to the case where the occupant 350 of the vehicle normally wears the seat belt. The draw length corresponding to the case where the occupant 350 of the vehicle normally wears the seat belt may be determined by a test (or experiment) and be stored in the memory.

When the draw length of the seat belt webbing 330 is not the draw length corresponding to the case where the occupant 350 of the vehicle normally wears the seat belt, the process of the method of detecting the seat belt of the vehicle may proceed to an operation 145, and when the draw length of the seat belt webbing 330 is the draw length corresponding to the case where the occupant 350 of the vehicle normally wears the seat belt, the process of the method of detecting the seat belt of the vehicle may proceed to an operation 150.

According to the operation 145, the controller 220 may be configured to control the display device 230 to display a third warning message indicating the occupant of the vehicle to normally wear the seat belt so that the occupant 350 of the vehicle is capable of viewing the third warning message.

According to the 150, the controller 220 may be configured to control the display device 230 to display a normal wearing message indicating that the occupant of the vehicle normally wears the seat belt.

The constituent element, "~unit", a block, or a module used in the exemplary embodiment of the present disclosure may be implemented by software, such as a task, class, subroutine, process, object, execution thread, and program performed in a predetermined area of a memory, or hardware, such as field-programmable gate array (FPGA) or an application-specific integrated circuit (ASIC), and may also be implemented by a combination of the software and the hardware. The constituent element, "~unit" or the like may also be included in a computer readable storage medium, and a part thereof may be distributed in the plurality of computers.

As described above, the exemplary embodiments have been disclosed in the drawings and the specification. The specific terms are used herein, but are only used for the purpose of describing the present disclosure, and are not used to limit the meaning or the scope of the present disclosure described in the claims. Accordingly, those skilled in the art will appreciate that various modifications and equivalent embodiments may be made without departing from the scope and spirit of the present disclosure. Therefore, the true technical protection scope of the present disclosure will be defined by the technical spirit of the accompanying claims.

What is claimed is:

1. A method of detecting a seat belt of a vehicle, the method comprising:
    storing, by a controller, a pattern before an occupant of a vehicle wears a seat belt webbing and a pattern after the occupant of the vehicle wears the seat belt webbing, photographed through a region of interest of a vision sensor in a memory;
    receiving, by the controller, an image for the seat belt webbing photographed in the region of interest of the vision sensor;
    determining, by the controller, whether the pattern of the seat belt webbing, stored in the memory, is detected from the image of the seat belt webbing; and when the pattern of the seat belt webbing is not detected, controlling, by the controller, a display device to display a first warning message indicating that the seat belt webbing is not detected.

2. The method of claim 1, further comprising:
determining, by the controller, whether the pattern that is detected from the image of the seat belt webbing is the pattern before the occupant of the vehicle wears the seat belt webbing, stored in the memory, or the pattern after the occupant of the vehicle wears the seat belt, stored in the memory; and
wherein when the pattern that is detected from the image of the seat belt webbing is the pattern before the occupant of the vehicle wears the seat belt webbing, stored in the memory, controlling, by the controller, the display device to display a second warning message instructing the occupant of the vehicle to wear a seat belt.

3. The method of claim 2, further comprising, when the pattern that is detected from the image of the seat belt webbing is the pattern after the occupant of the vehicle wears the seat belt, stored in the memory, calculating, using the controller:
a draw length of the seat belt webbing based on a sequence number corresponding to a topmost end pattern among detected patterns after the occupant of the vehicle wears the seat belt; and
a sequence number corresponding to a lowermost end pattern among the detected patterns after the occupant of the vehicle wears the seat belt.

4. The method of claim 3, further comprising:
determining, by the controller, whether the draw length of the seat belt webbing is a draw length corresponding to normal wearing of the seat belt; and
when the draw length of the seat belt webbing is not the draw length corresponding to the normal wearing of the seat belt, controlling, using the controller, the display device to display a third warning message instructing the occupant of the vehicle to normally wear the seat belt.

5. The method of claim 4, further comprising, when the draw length of the seat belt webbing is the draw length corresponding to the normal wearing of the seat belt, controlling, using the controller, the display device to display a normal wearing message indicating that the occupant of the vehicle normally wears the seat belt.

6. The method of claim 1, wherein:
the vision sensor comprises an infrared camera, and
the pattern of the seat belt webbing is formed by a paint highly reflecting infrared rays.

7. The method of claim 1, wherein the pattern of the seat belt webbing comprises patterns corresponding to numbers according to a numeral system.

8. The method of claim 7, wherein the pattern comprises quadrangular patterns or character patterns.

9. A device for detecting a seat belt of a vehicle, the device comprising:
a vision sensor configured to photograph a seat belt webbing through a region of interest; and
a controller configured to:
store a pattern before an occupant of a vehicle wears a seat belt webbing and a pattern after the occupant of the vehicle wears the seat belt webbing photographed through the region of interest in a memory;
receive an image for the seat belt webbing photographed in the region of interest;
determine whether the pattern of the seat belt webbing stored in the memory is detected from the received image of the seat belt webbing; and
when the pattern of the seat belt webbing is not detected, control a display device to display a first warning message indicating that the seat belt webbing is not detected.

10. The device of claim 9, wherein the controller is further configured to:
determine whether the pattern that is detected from the received image of the seat belt webbing is the pattern before the occupant of the vehicle wears the seat belt webbing stored in the memory or the pattern after the occupant of the vehicle wears the seat belt stored in the memory; and
when the pattern that is detected from the received image of the seat belt webbing is the pattern before the occupant of the vehicle wears the seat belt webbing stored in the memory, control the display device to display a second warning message instructing the occupant of the vehicle to wear a seat belt.

11. The device of claim 10, wherein, when the pattern that is detected from the received image of the seat belt webbing is the pattern after the occupant of the vehicle wears the seat belt stored in the memory, the controller is further configured to calculate:
a draw length of the seat belt webbing based on a sequence number corresponding to a topmost end pattern among detected patterns after the occupant of the vehicle wears the seat belt; and
a sequence number corresponding to a lowermost end pattern among the detected patterns after the occupant of the vehicle wears the seat belt.

12. The device of claim 11, wherein the controller is further configured to:
determine whether the draw length of the seat belt webbing is a draw length corresponding to normal wearing of the seat belt, and
when the draw length of the seat belt webbing is not the draw length corresponding to the normal wearing of the seat belt, control the display device to display a third warning message instructing the occupant of the vehicle to normally wear the seat belt.

13. The device of claim 12, wherein, when the draw length of the seat belt webbing is the draw length corresponding to the normal wearing of the seat belt, the controller is further configured to control the display device to display a normal wearing message indicating that the occupant of the vehicle normally wears the seat belt.

14. The device of claim 9, wherein:
the vision sensor comprises an infrared camera, and
the pattern of the seat belt webbing is formed by a paint highly reflecting infrared rays.

15. The device of claim 9, wherein the pattern of the seat belt webbing comprises patterns corresponding to numbers according to a numeral system.

16. The device of claim 15, wherein the pattern comprises quadrangular patterns or character patterns.

17. A vehicle comprising the device of claim 9.

* * * * *